US007247685B2

(12) United States Patent
Nishida et al.

(10) Patent No.: US 7,247,685 B2
(45) Date of Patent: Jul. 24, 2007

(54) ZERO VALENT METAL INITIATED GAS-PHASE DEPOSITION POLYMERIZATION

(75) Inventors: Haruo Nishida, Fukuoka (JP); Yoshito Andou, Fukuoka (JP); Takeshi Endo, Yamagata (JP); Mikio Yasutake, Fukuoka (JP)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 11/318,933

(22) Filed: Dec. 27, 2005

(65) Prior Publication Data

US 2006/0241253 A1 Oct. 26, 2006

Related U.S. Application Data

(63) Continuation of application No. PCT/EP2004/003694, filed on Apr. 7, 2004.

(30) Foreign Application Priority Data

Jun. 30, 2003 (EP) ................... 03014884

(51) Int. Cl.
 C08F 2/34 (2006.01)
 C08F 4/00 (2006.01)
(52) U.S. Cl. .............. 526/108; 526/135; 526/191; 526/901; 427/255.6; 427/328; 525/269; 525/270
(58) Field of Classification Search ............... 526/108, 526/191, 901, 135; 525/269, 270; 427/255.6, 427/328
See application file for complete search history.

(56) References Cited

U.S. PATENT DOCUMENTS

| 3,967,006 | A | 6/1976 | Yamaguchi et al. |
| 6,284,850 | B1 | 9/2001 | Percec |
| 2005/0113475 | A1 | 5/2005 | Nishida et al. |

FOREIGN PATENT DOCUMENTS

| WO | WO 97/48736 A1 | 12/1997 |
| WO | WO 98/01480 A1 | 1/1998 |
| WO | WO 98/20050 A2 | 5/1998 |
| WO | WO 98/40415 A1 | 9/1998 |

OTHER PUBLICATIONS

Otsu et al., "New Initiator Systems For Radical Polymerization of vinyl Monomers", *Polymer Letters*, vol. 5, pp. 697-701 (1967).
Otsu et al., "Metal-Containing Initiator Systems. IV. Polymerization of Methyl Methacrylate by Systems of Some Activiated Metals and Organic Halides", *Journal of Polymer Science*, Part A-1, vol. 6, pp. 3075-3086 (1968).
Otsu et al., "Initiation of Vinyl Polymerizatin By Systems of Activated Metals and Organic Halides Having Various Types of Halogen Bonds", *Polymer Letters*, vol. 5, pp. 835-837 (1967).
Matyjaszewski et al., "Preparation of hyperbranched polyacrylates by atom transfer radical polymerizatio 4", *Macromol. Rapid Commun.*, vol. 19, pp. 665-670 (1998).
Destarac et al., "Polychloroalkane initiators in copper-catalyzed atom transfer radical polymerization of (meth)acrylates", *Macromol. Chem. Phys.*, vol. 201, pp. 265-272 (2000).
Kondakov et al., "The Mechanism of Polyhalomethan Addition to Multiple Bonds in the Presence of Ultradispersed Metallic Particles in the Medium of Ternary Amines", *Kinetics and Catalysis*, vol. 36, No. 3, pp. 315-319 (1995).
Iwatsuki et al., "Polymerization of Methylmethacrylate Initiated by Hydrogenation Catalysts", *Die Makromolekular Chemie*, vol. 104, pp. 254-262 (1967).
Adandei et al., "From metal-Catalyzed Radical Telomerization to Metal-Catalyzed Radical Polymerizatio of Vinyl Chloride: Toward Living Radical Polymerization of Vinyl Chloride", *Journal of Polymer Science*, Part A: Polymer Chemistry, vol. 39, pp. 3392-3418 (2001).
Brunauer et al., "Adsorption of Gases in Multimolecular Layers", Journal of America Chemical Society, vol. 60, pp. 309-319 (1938).
McDaniel et al., "Total Porosity of High-Pore-Volume Silicas by Liquid Adsorption", *Journal of Colloid and Interface Science*, vol. 78, No. 1, pp. 31-36 (1980).
J. Cornillault, "Particle Size Analyzer", *Applied Optics*, vol. 11, No. 2, pp. 265-268 (1972).
Ullmanns Enzyklopaedie der technischen Chemie, vol. 19, pp. 195-211.
Ullmanns Enzyklopaedie der technischen Chemie, vol. 19, pp. 265-295.
Ullmanns Enzyklopaedie der technischen Chemie, vol. 19, pp. 31-38.
Ullmanns Enzyklopaedie der technischen Chemie, vol. 21, pp. 439-476.
Ullmanns Enzyklopaedie der technischen Chemie, vol. 23, pp. 311-326.
Ullmanns Enzyklopaedie der technischen Chemie, vol. 14, pp. 633-648.
Ullmanns Enzyklopaedie der technischen Chemie, vol. 24, pp. 575-578.

*Primary Examiner*—Fred Teskin
(74) *Attorney, Agent, or Firm*—Stephen D. Harper

(57) ABSTRACT

The present invention relates to a method for preparing polymers by gas-phase deposition polymerization, initiated by a zero valent metal and an initiator.

21 Claims, No Drawings

ZERO VALENT METAL INITIATED GAS-PHASE DEPOSITION POLYMERIZATION

CROSS-REFERENCE TO RELATED APPLICATIONS

This application is a continuation under 35 USC Sections 365(c) and 120 of International Application No. PCT/EP2004/003694, filed 7 Apr. 2004 and published in English 13 Jan. 2005 as WO 2005/003183, which claims priority from European Application No. 03014884.5, filed 30 Jun. 2003, each of which is incorporated herein by reference in its entirety.

FIELD OF THE INVENTION

The present invention relates to a novel method for preparing polymers by gas-phase deposition polymerization (GDP).

DISCUSSION OF THE RELATED ART

The development of atom transfer radical polymerization (ATRP) has grown rapidly in recent years as metal-mediated polymerization systems to prepare novel materials have been explored. The main focus of previous efforts has, however, been directed to polymerizations in bulk or in solution. Both types of ATRP are known to propagate by a controlled/living radical process.

It is well known that transition metals including ruthenium, iron, copper, nickel, palladium, rhenium and molybdenum with ligands and organic halides are usable as ATRP-catalysts. In particular iron and copper based catalysts are attractive due to their lower price and generally non-toxic nature. Thus, the controlled radical polymerization by iron and copper based catalysts has been successively accomplished.

The prior art, however, mainly concentrates on two types of ATRP, namely the polymerization in bulk and the polymerization in solution. Both processes, however, have serious disadvantages with regard to the environmental impact of the use of solvents and the control over bulk processes with regard to sample thickness.

Metal initiated radical polymerization has been known for a long time. Otsu, Yamaguchi, Takemura, Kusuki and Aoki describe the use of activated metals as initiators for polymerizations in the presence of carbon tetrachloride (Polymer Letters, 5, 697-701, 1967). The use of such activators for a polymerization in the gas-phases was, however, not mentioned.

Otsu and Yamaguchi describe metal containing initiator systems in the polymerization of methyl methacrylate (Journal of Polymer Science, part A-1, 6, 3075-3085, 1968). The documents describe the polymerization of methyl methacrylate, initiated by binary systems of activated metal and organic halides in solution. The polymerization in the gas-phase is not mentioned.

In Polymer Letters, 5, 835-837, 1967, Otsu, Aoki, Nishimura, Yamaguchi and Kusuki describe the initiation of vinyl polymerization by systems of activated metals and organic halides having various types of halogen bonds. The initiator activity for vinyl polymerization of systems containing $Ni^0$ and halogen compounds containing chemical bonds such as N—X, O—X, S—X, P—X and Si—X, where X stands for a halogen atom, was determined. No mention, however, of a polymerization in the gas-phase was made.

Matyjaszewski, Pyun and Gaynor describe the addition of zero-valent copper to the self-condensing vinyl polymerization of AB methacrylic monomers using atom transfer radical polymerization catalyst systems (Macromol. Rapid Commun., 19, 665-670, 1999). The authors describe that polymerization under homogeneous and heterogeneous catalyst conditions without additional Cu(0) were unsuccessful. The described polymerizations, however, are based on catalyst systems using a ligand. Polymerization in the gas-phase is not mentioned.

In Macromolecular Chemistry and Physics, 201, 265-272, 2000, Destarac, Matyjaszewski and Boutevin describe the atom transfer radical polymerization of methyl methacrylate catalyzed-YCuCl/bpy with 1,1,1-trichloroalkanes or $CCl_4$. The accelerating effect of the addition of Cu(0) is also mentioned. A ligand, however, is needed to obtain controlled polymerization results. Furthermore, a polymerization in the gas-phase is not described.

Kondakov and Smirnov in Kinetics and Catalysis, 36 [3], 315-319, 1995, describe the mechanism of polyhalomethane addition to multiple bonds in the presence of ultra dispersed metallic particles in a medium of ternary amines. Polymerization in the gas-phase, however, is not mentioned.

Nishimura, Ishida, Mimura, Nakazawa and Yamashita describe the cyclopolymerization of 1,3-bis-(p-vinylphenyl)-propane using zero-valent Ni. Polymerization in the gas-phase, however, is not mentioned.

The influence of carbon tetra chloride on the metal initiated polymerization of methyl methacrylate is described by Iwatsuki, Kasahara and Yamashita in Makromolekulare Chemie, 104, 254-262, 1967. Polymerization in the gas-phase is not described.

Journal of Polymer Science, part A, Polymer Chemistry, 39, 3392-3418, 2001, Asandei and Percec describe the metal-catalyzed radical polymerization of vinyl chloride in ortho-dichlorobenzene initiated with various activated halides. The polymerization in the gas-phase is not mentioned.

Mori, Suzuki, Shimizu and Oishi describe the evaporation polymerization of 6-dibutylamino-1,3,5-triazine-2,4-dithiol. The polymerization is believed to propagate according to a radical mechanism. However, iron oxide is believed to be the initiator and the monomers do not possess a vinylic double bond.

WO 97/48736 relates to a supported late transition metal catalyst system. Late transition metal catalyst systems, which are immobilized on solid supports and their use in heterogeneous polymerization processes, particularly in gas-phase polymerization of olefinic monomers, are described. According to the document polymerization is achieved by group 9, 10 or 11 metal complexes which are stabilized by a bidentate ligand structures which are immobilized on a solid support.

WO 98/20050 relates to the polymerization of vinyl monomers. According to the document, free radically polymerizable monomers may be polymerized using a combination of a selected arylsulfonyl halide or alkylsulfonyl halide and a selected compound containing a lower valent transition metal atom as an initiator. The polymerizations, however, are performed in bulk or solution. Polymerization in the gas-phase is not disclosed.

WO 98/01480 relates to a process of ATRP for the synthesis of homopolymers, block or graft copolymers. The initiating system comprises an initiator having a radically transferable atom or group, a transition metal compound and a ligand. While the document mentions the application of the described method in the gas-phase, the polymerization according to the disclosed method in the gas-phase is apt to be inhibited by the ligand.

WO 98/40415 relates to improvements in atom or group transfer radical polymerization. The document describes a process for ATRP, wherein a transition metal with one or more N—, O—, P— or S-containing ligands is used. Also added is a transition metal in its zero oxidation state. The document also describes that the process can be performed in the gas-phase. However, the polymerization according to the described method in the gas-phase is also apt to be inhibited by the ligand.

Metal-polymer composite materials are employed in numerous areas. The useful application for such composites is corrosion protection, microelectronics, molecular adhesion promoters and the like. Coating of metal surfaces is especially interesting for obtaining micropatterns or, in the event that the metal surface is of a particle, microparticle or nanoparticle, for coated particles usable in various applications. Most of the surface coating technology, however, makes use of bulk or solvent processes. While solvent processes usually are inefficient and exhibit a low environmental compatibility, bulk surface coating technologies suffer from the problem that the thickness of the coating is usually hard to control. Bulk coating processes, however, further suffer from disadvantages like the necessity of removal of residual monomers and free polymers occurring in the bulk, the disappearance of microstructures such as micro-pores and micro-apertures by packing, and the like. The solution coating is limited to inert combinations between the substrate and solvent. Furthermore, solvent based processes and bulk processes usually are performed using a ligand which has to be removed from the polymer composition after the polymerization reaction. Thus, post treatments of the reaction product are often necessary in order to arrive at the desired polymer composition.

BRIEF SUMMARY OF THE INVENTION

It has thus been an object of the invention to provide a process for the coating of surfaces, which allows for an easy control of coating thickness. It has further been an object of the present invention to provide a process for a coating of surfaces which makes the use of solvents unnecessary. It has been another object of the present invention to provide a process for the coating of surfaces which does not need post reaction treatment of the composite materials obtained.

The above objects and further objects, as they become apparent to the skilled person upon consideration of the disclosure of the present invention, are solved by a process as is disclosed in the present text and the claims.

The invention therefore relates to a process for the radical polymerization of a radically polymerizable monomer or a mixture of two or more radically polymerizable monomers in a reactor, wherein at least one zero valent transition metal selected from groups 3 to 12 of the periodic system of elements is contacted with an initiator having one or more radically transferable atoms or groups and the radically polymerizable monomer or monomers are introduced into the reactor in the gas-phase and the reactor temperature during the polymerization reaction is at a temperature, where the radically polymerizable monomer or monomers are present in the gas-phase, characterized in that the molar ratio of zero valent metal to N—, O—, P— or S-containing ligands which coordinate in a σ-bond or a π-bond to the transition metal and are not built into the polymer or the amount of C-containing compounds which can coordinate in a π-bond to the transition metal and are not built into the polymer is more than 1:1.

DETAILED DESCRIPTION OF CERTAIN EMBODIMENTS OF THE INVENTION

In the context of the present application, the terms "macromolecule" and "polymer" refer to a molecule containing a large number of monomeric units and having a number average molecular weight ($M_n$) of at least 400.

(1) Monomers

According to the present invention any radically polymerizable alkene can serve as a monomer for polymerization. The preferred monomers include those of the formula (I)

wherein $R^1$ and $R^2$ are independently selected from the group consisting of H, halogen, $CF_3$, straight or branched alkyl of 1 to 20 carbon atoms (preferably from 1 to 6 carbon atoms, more preferably from 1 to 4 carbon atoms), aryl, alpha, beta-unsaturated straight or branched alkenyl or alkynyl of 2 to 10 carbon atoms (preferably from 2 to 6 carbon atoms, more preferably from 2 to 4 carbon atoms), alpha, beta-unsaturated straight or branched alkenyl of 2 to 6 carbon atoms (preferably vinyl) substituted (preferably at the alpha-position) with a halogen (preferably chlorine), $C_3$-$C_8$ cycloalkyl, heterocycloalkyl, $YR^5$, $C(=Y)R^5$, $C(=Y)YR^5$, $C(=Y)NR^6R^7$ and $YC(=Y)R^6$, where Y may be S, $NR^6$ or O (preferably O), $R^5$ and $R^6$ are alkyl of from 1 to 20 carbon atoms, alkoxy of from 1 to 20 carbon atoms, aryloxy or heterocycloxy, $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring, and $R^6$ is H, straight or branched $C_1$-$C_{20}$ alkyl and aryl, $R^3$ is selected from the group consisting of H, halogen (preferably fluorine or chlorine), $C_1$-$C_6$ (preferably $C_1$) alkyl, $COOR^8$ (where $R^8$ is H, an alkali metal, or a $C_1$-$C_{20}$ alkyl group in which each hydrogen atom may be replaced with halogen, preferably fluorine or chlorine, or $C_nH_{2n}Y_mSiR^9_3$, in which n is from 1 to 8, m is 1 or 0, Y may be S or O and $R^9$ is selected from the group consisting of H, Cl, $C_1$-$C_{20}$ alkyl and alkoxy of from 1 to 4 carbon atoms) or aryl; or $R^1$ and $R^3$ may be joined to form a group of the formula $(CH_2)_{n'}$ (which may be substituted with from 1 to 2n' halogen atoms or $C_1$-$C_4$ alkyl groups) or $C(=O)$—Y—$C(=O)$, where n' is from 2 to 6 (preferably 3 or 4) and Y is as defined above; or $R^4$ is the same as $R^1$ or $R^2$ or optionally $R^4$ is a CN group.

In the context of the present invention, the terms "alkyl", "alkenyl" and "alkynyl" refer to straight-chain or branched groups (except for $C_1$ and $C_2$ groups).

Furthermore, in the context of the present invention, "aryl" refers to phenyl, naphthyl, phenanthryl, phenylenyl, anthracenyl, triphenylenyl, fluoroanthenyl, pyrenyl, chrysenyl, naphthacenyl, hexaphenyl, picenyl and perylenyl (preferably phenyl and naphthyl), in which each hydrogen atom may be replaced with alkyl of from 1 to 20 carbon atoms (preferably from 1 to 6 carbon atoms and more preferably methyl), alkyl of from 1 to 20 carbon atoms (preferably from 1 to 6 carbon atoms and more preferably methyl) in which each of the hydrogen atoms can be independently replaced by a halogen (for example by a fluorine or a chlorine), alkenyl of from 2 to 20 carbon atoms, alkynyl of from 1 to 20 carbon atoms, alkoxy of from 1 to 6 carbon atoms, alkylthio of from 1 to 6 carbon atoms, $C_3$-$C_8$ cycloalkyl, phenyl, halogen, $NH_2$, $C_1$-$C_6$ alkylamino, $C_1$-$C_6$ dialkylamino, and *phenyl, which may be substituted with from 1 to 5-halogen atoms and/or $C_1$-$C_6$ alkyl groups. (This definition of "aryl" also applies to the aryl groups in "aryloxy" and "aralkyl"). Thus, phenyl may be substituted from 1 to 5 times and naphthyl may be substituted from 1 to 7 times (preferably, any aryl group, if substituted, is substituted from 1 to 3 times) with one of the above substituents.

More preferably, "aryl" refers to phenyl, naphthyl, phenyl substituted from 1 to 5 times with fluorine or chlorine, and phenyl substituted from 1 to 3 times with a substituent selected from the group consisting of alkyl of from 1 to 6 carbon atoms, alkoxy of from 1 to 4 carbon atoms and phenyl. Most preferably, "aryl" refers to phenyl and tolyl.

In the context of the present invention, "heterocyclyl" refers to pyridyl, furyl, pyrrolyl, thienyl, imidazolyl, pyrazolyl, pyrazonyl, pyrimidinyl, pyridazinyl, pyranyl, indolyl, isoindolyl, indazolyl, benzofuryl, isobenzofuryl, benzothienyl, isobenzothienyl, chromenyl, xanthenyl, purinyl, piperidinyl, quinolyl, isoquinolyl, phthalazinyl, quinazolinyl, quinoxalinyl, naphthyridinyl, phenoxathiinyl, carbazolyl, cinnolinyl, phenanthridinyl, acridinyl, 1,10-phenanthrolinyl, phenazinyl, phenoxazinyl, phenothiazinyl, oxazolyl, thiazolyl, isoxazolyl, isothiazolyl, and hydrogenated forms thereof known to those in the art.

Preferred heterocyclyl groups include pyridyl, furyl, pyrrolyl, thienyl, imidazolyl, pyrazolyl, pyrazinyl, pyrimidinyl, pyridazinyl, pyranyl and indolyl, the most preferred heterocyclyl group being pyridyl. Accordingly, suitable vinyl heterocyclyls to be used as a monomer in the present invention include 2-vinyl pyridine, 4-vinyl pyridine, 2-vinyl pyrrole, 2-vinyl pyrrole, 2-vinyl oxazole, 4-vinyl oxazole, 9-vinyl oxazole, 2-vinyl thiazole, 4-vinyl-thiazole, 5-vinyl-thiazole, 2-vinyl imidazole, 4-vinyl imidazole, 3-vinyl pyrazole, 4-vinyl pyrazole, 3-vinyl pyridazine, 4-vinyl pyridazine, 3-vinyl isoxazole, 3-vinyl isothiazoles, 2-vinyl pyrimidine, 4-vinyl pyrimidine, 5-vinyl pyrimidine, and any vinyl pyrazine.

The vinyl heterocycles mentioned above may bear one or more (preferably 1 or 2) $C_1$-$C_6$ alkyl or alkoxy groups, cyano groups, ester groups or halogen atoms, either on the vinyl group or the heterocyclyl group. Further, those vinyl heterocycles which, when unsubstituted, contain an N—H group may be protected at that position with a conventional blocking or protecting group, such as a $C_1$-$C_6$ alkyl group, a tris-$C_1$-$C_6$ alkylsilyl group, an acyl group of the formula $R^{10}CO$ (where $R^{10}$ is alkyl of from 1 to 20 carbon atoms, in which each of the hydrogen atoms may be independently replaced by a halogen, preferably fluorine or chlorine), alkenyl of from 2 to 20 carbon atoms (preferably vinyl), alkynyl of from 2 to 10 carbon atoms (preferably acetylenyl), phenyl which may be substituted with from 1 to 5 halogen atoms or alkyl groups of from 1 to 4 carbon atoms, or aralkyl (aryl-substituted alkyl, in which the aryl group is phenyl or substituted phenyl and the alkyl group is from 1 to 6 carbon atoms), etc.. (This definition of "heterocyclyl" also applies to the heterocyclyl groups in "heterocyclyloxy" and "heterocyclic ring.")

More specifically, preferred monomers include (but not limited to) styrene, vinyl acetate, acrylate and methacrylate esters of $C_1$-$C_{20}$ alcohols, acrylic acid, methacrylic acid, t-butyl acrylate, hydroxyethyl-methylacrylate, isobutene, acrylonitrile, and methacrylonitrile.

Most preferred monomers are acrylic and methacrylic acid esters having from 1 to about 20 carbon atoms in the alcohol moiety, styrene, vinyl substituted styrene, such as α-alkyl styrene or ring substituted styrene such as p-alkyl styrene; such monomers are commercially available or can be easily prepared by known esterification processes. Preferred esters are n-butyl acrylate, ethyl acrylate, methyl methacrylate, isobornyl methacrylate, 2-ethylhexyl acrylate, t-butylacrylate, hydroxyethylmethylacrylate, acrylate and methacrylate esters of $C_1$-$C_{20}$ fluorinated alcohols; preferred styrenic monomers are styrene, alpha-methyl styrene, p-methyl styrene, p-tert-butyl styrene, p-acetoxy styrene and ring-halogenated styrene.

(2) Zero Valent Metal:

Generally, the method according to the present invention can be performed with all types of zero-valent metals which are able to activate the organic halide used as an initiator in the method according to the present invention. The method works especially well with so called transition metals as can be found in groups 3 to 12 in the periodic system of elements (PSE).

Due to considerations regarding price or availability of certain metals, the use of conventional metals like those to be found in the fourth period of the above-mentioned groups may be preferred. It must, however, be emphasized that considerations regarding the functionality of certain metals might lead to the preference of metals from period 5 or 6, regardless of their price or availability. The main aspect with regard to the use of a certain metal in the method according to the present invention is its functionality concerning the initiation of the gas-phase deposition polymerization (GDP) together with an initiator as described below.

It has, however, been proved to be advantageous to employ metals of period 4 of the PSE, especially metals of groups 4, 5, 6, 7, 8, 9, 10 or 11 in their zero-valent state. Especially preferred are metals like titanium, chromium, manganese, ruthenium, iron, nickel or copper. Outstanding results have, so far, been obtained with iron and copper, which are, accordingly, the most preferred metals in the process according to the present invention.

The above-mentioned metals can be used in a pure state or in a mixture with other components, e.g., in alloys. It is also possible that the metals comprise atoms which are in a higher oxidation state such as oxidized or halogenated atoms, e.g., $Fe_2O_3$, $Fe_3O_4$, $FeCl_2$, $FeCl_3$, $FeBr_2$, $FeBr_3$, $CuO$, $Cu_2O$, $CuCl$, $CuCl_2$, $CuBr$ or $CuBr_2$. Basically all types of combinations between the above-mentioned zero-valent metals or between one or more of the above-mentioned zero-valent metals and one or more of their ions in a higher oxidation state are possible, as long as there is sufficient zero-valent metal to activate the organic halide as an initiator.

The metals can generally be present in any desired geometrical form, as long as they fit in a reactor housing for carrying out the process according to the invention. Suitable forms are, e.g., films, sheets, plates, powder, particles, moldings or fibers and the like.

The metals can be present as a surface part of another supporting material which can be inorganic or organic or even another type of metal. In case, the metal to be used in the process according to the present invention is not the supporting material of the structure to be used in the GDP process, this metal can be applied to the surface of the supporting structure by known means, e.g., by splattering, gilding, plating, surface reduction or adsorption by static electricity and the like.

(3) Initiators:

According to the process of the present invention compounds having one or more radically transferable atoms or groups are used as initiators. The concept of the process according to the present invention comprises a contact between the zero-valent metal and the initiator which results in the formation of a radical being able to initiate the polymerization of the above described class of monomers.

According to the process of the present invention all types of initiators can be used which, upon contact with the zero valent metal, generate a radical which is able to initiate a radical polymerization of the above described class of monomers. It has, however, proven successful to employ organic halide compounds as initiators.

Generally, all types of organic halide compounds which can be converted to an initiator upon contact with a zero-valent metal can be employed in the process according to the present invention.

Suitable initiators include those of the formula (A):

$R^{11}R^{12}R^{13}CX$ (A), wherein X is selected from the group consisting of Cl, Br, I, $SR^{14}$, $SeR^{14}$, SCN (thiocyanate), $SO_2Cl$, $SO_2Br$, $OC(=O)R^{14}$, $OP(=O)R^{14}$, $OP(=O)(OR^{14})_2$, $OP(=O)OR^{14}$, $ON(R^{14})_2$ and $S—C(=S)N(R^{14})_2$, where $R^{14}$ is aryl or a straight or branched $C_1$-$C_{20}$ (preferably $C_1$-$C_{10}$) alkyl group, or when an $ON(R^{14})_2$ group is present, the two $R^{14}$ groups may be joined to form an 5-, 6-, or 7-membered heterocyclic ring, and $R^{11}$, $R^{12}$, and $R^{13}$ are each independently selected from the group consisting of H, halogen, $C_1$-$C_{20}$ alkyl (preferably $C_1$-$C_{10}$ alkyl and more preferably $C_1$-$C_6$ alkyl), $C_3$-$C_9$ cycloalkyl, $C(=Y)R^{15}$, $C(=Y)NR^{16}R^{17}$ (where $R^{15}$ is alkyl of 1-20 carbon atoms, alkoxy of 1-20 carbon atoms, aryloxy or heterocycloxy, $R^{16}$ and $R^{17}$ are independently H or alkyl of 1-20 carbon atoms, or $R^{16}$ and $R^{17}$ may be joined together to form a 3- to 6-membered ring, Y may be O, S, or $NR^{18}$, where $R^{18}$ is H or alkyl of 1-5 carbon atoms), COCl, OH, $C_2$-$C_{20}$ alkenyl or alkynyl (preferably $C_2$-$C_6$ alkenyl or alkynyl, and more preferably vinyl), oxiranyl, glycidyl, aryl, heterocyclyl, aralkyl, aralkenyl (aryl-substituted alkenyl, where alkenyl is vinyl which may be substituted with one or two $C_1$-$C_6$ alkyl groups and/or halogen atoms, preferably chlorine), $C_1$-$C_6$ alkyl in which from 1 to all of the hydrogen atoms (preferably 1) are replaced with halogen, $C_1$-$C_4$ alkoxy, aryl, heterocyclyl, $C(=Y)R^{15}$, $C(=Y)NR^{16}R^{17}$, oxiranyl and glycidyl such that no more than two of $R^{11}$-$R^{13}$ are H (preferably no more than one of $R^{11}$-$R^{13}$ are H), provided that the structure of the initiator results in the formation of a radically transferable group upon contact of the initiator with a zero valent metal as mentioned above.

Preferably, in the present initiator at least one of the groups $R^{11}$-$R^{13}$ is a side chain group of a polymeric material which can be a supporting material for the polymerization according to the present invention.

In the present initiator, X is preferably Cl, Br, $SO_2Cl$ or $SO_2Br$, and at least one of $R^{11}$-$R^{13}$ is preferably Cl or Br and others are H, F and/or $C_1$-$C_2$ carbon atoms substituted by F, because of the effective feeding from the gas-phase to substrate surfaces.

Preferred initiators include chloroform, dichloromethane, carbon tetrachloride, 1,1-dichloroethane, 1,2-dichloroethane, 1-phenylethyl chloride, 1-phenylethyl bromide, 2-bromopropionitrile, $C_1$-$C_9$ alkyl esters of 2-chloropropionic acid, 2-bromopropionic acid, 2-chloroisobutyric acid, and 2-bromoisobutyric acid, methyl α-bromophenylacetate, and p-toluenesulfonyl chloride. $C_1$-$C_3$ alkyl esters of α-halocarboxylic acids are especially preferred initiators.

These initiators can be used alone or as combinations of two or more of the above-mentioned initiators.

Generally, the amount of initiator used is not critical to the success of the process according to the present invention. It has, however, been found to be advantageous, if the molar ratio of monomer to initiator initially present in the reactor is about 3 to about 1000, especially about 50 to about 1000 in the cases of pre-coated initiators, and about 3 to about 10 in the cases of vaporized initiators.

The term "initially present in the reactor" in the context of the present invention relates to the conditions in the reactor just before the start of the polymerization reaction. This means that the complete amount of radically polymerizable monomer or monomer mixture to be used in one polymerization is defined to be present in the reactor, irrespective of whether the monomer is completely or partially or not at all in the gas phase. The term "initially present in the reactor" is thus to be interpreted as a defining the conditions in the reactor relating to the amount of zero valent metal, initiator and monomer in the reactor immediately before the polymerization starts. The term "initially present in the reactor" only takes into account the first step of a process according to the invention, irrespective of the number of consecutive steps to be performed according to the present invention as defined below and especially irrespective of the fact whether additional monomer is introduced into the reactor during the process or not.

Generally, the process according to the present invention can be carried out on all types of substrates, which have at least partially metallic surfaces. The metallic surfaces can comprise catalytic zero valent metals according to the above description or mixtures of catalytic zero valent metals according to the above description and non-catalytic metals. The non-catalytic metal and non-metallic surfaces are inert towards the employed Me(0)/initiator combination under the chosen conditions or on substrates, which will form a desired ionic or covalent bond between an initiator molecule and the substrate surface. Suitable substrates can be chosen from inorganic or organic materials. The substrates can basically have any desired geometrical form, as long as they fit into a reactor housing for carrying out the process of the invention.

Suitable functions of metallic and non metallic substrates are adsorption, adhesion and deposition of Me(0) on their surfaces, in which all usable procedures can be adapted, for example, static electricity, spattering, melting, swelling, gilding and plating.

Suitable substrate forms are e.g. films, sheets, plates, powder, particles, moldings, fibers, especially textile fibers like cellulose, polyester, polyamide, cotton, silk, modifications and mixtures thereof or fabrics, e.g., fabrics made from the above mentioned fibers.

Suitable materials are inorganic materials such as porous or non porous inorganic carrier materials.

Suitable non-porous inorganic substrate materials are non-porous metals, non-porous glasses, non-porous ceramics or naturally occurring inorganic materials like marble or granite or the like. The surfaces of the above-mentioned materials can be mechanically processed, e.g. polished.

The inorganic materials can be used as substrates in any of the above-mentioned shapes. They can be used e.g. as bulk substances, granules, powders, chips, wires, tapes, pins or rods.

In another embodiment of the present invention, the materials used as substrates can be porous. The term "porous", as used according to the present text relates to materials, which have a sufficient high pore volume, surface and particle size. Suitable substrates are particular organic or inorganic solid materials which have a pore volume of between 0.1 and 15 ml/g, preferably between 0.25 and 5 ml/g and their specific surface is greater than 1 $m^2/g$, preferably more than 10, more than 100 or more than 1000 $m^2/g$ (BET). The particle size of suitable, porous materials is between about 10 and about 2500 µm, preferably between about 50 and about 1000 µm.

The specific surface is determined according to the well-known method of Brunauer, Emmet and Teller J. Am. Chem. Soc., 60, 309-319, 1938. The pore volume is determined by the centrifugation method according to McDaniel, J. Colloid Interface Sci., 78, 31, 1980, and the particle size is determined according to Cornillaut, Appl. Opt., 11, 265, 1972.

The term "inert" means that the substrates do not suppress the polymerization reaction such that the polymerization itself is inhibited and does not react with the monomers in an undesired way.

Organic, solid substrates can also be used in the process according to the present invention in any of the above-mentioned forms. Suitable organic substrates can be synthetic substrates or natural substrates. The term "natural substrates" also relates to materials which have been manufactured using natural materials, like paper, textiles, fibers and the like.

Suitable synthetic organic substrates can be made from derivatives of naturally occurring materials like starch or cellulose or can be made from synthetic organic polymers. Suitable polymers are for instance polyolefins like polyethylene, polypropylene, polystyrene, polybutadiene, polyacrylonitrile, polyacrylates like polymethylacrylate, polymethylmethacrylate, polyethers like polyethyleneoxide, polypropyleneoxide, polyoxytetramethylene, polysulfides like poly-p-phenylenesulfide, polyesters, polyetheresters, fluorinated polymers like polytetrafluoroethylene, polyamides or polyurethanes. Suitable organic support materials are, e.g., described in Ullmanns Enzyklopädie der technischen Chemie, vol. 19, page 195 ff., page 265 and page 31 ff.

Suitable inorganic solids are, e.g. silica gels, silica gels obtained by precipitation, clay, alumosilicates, talc, mica, zeolites, soot, inorganic oxides like silicon dioxide, alumina, magnesia, titanium dioxide, inorganic chlorides like magnesium chloride, sodium chloride, lithium chloride, calcium chloride, zinc chloride or calcium carbonate. Suitable inorganic support materials are also described in Ullmanns Enzyklopädie der technischen Chemie, vol. 21, pages 439 and ff., volume 23, pages 311 and ff., volume 14, pages 633 and ff and vol. 24, pages 575 and ff.

The polymerization according to the present invention is performed in the gas-phase. In the context of the present invention the term "in the gas-phase" means that the monomer or the mixture of two or more monomers contact the initiator or a propagating species by direct access from the gas-phase or subsequently by migration on the substrate surface or in a solid phase of polymer film without interaction in a liquid phase.

This does, however, not mean, that the gas-phase in the process according to the present invention must be completely free from "liquids". It is also within the scope of the present invention that the gas-phase contains microdroplets of monomers which can be spread in the gas-phase by a carrier gas, depending on the method of introduction of the monomer or the monomer mixture into the gas-phase. It is, however, preferred that the gas-phase in a process according to the present invention is essentially free of such microdroplets, preferably free of microdroplets.

Without wishing to be bound by a theory, it is believed that some of the monomer molecules directly contact the active chain ends from the gas-phase while other monomer molecules are adsorbed on the surface of the substrate or an already formed polymer layer on the surface and subsequently migrate to an active chain end to eventually take part in the polymerization process. It is also possible that some of the monomer molecules are adsorbed on the substrate or within the polymer layer such that they do not take part in the polymerization at all due to an immobilizing effect of the adsorption process on the monomer molecules.

Generally speaking, the process according to the present invention will not require a solvent or a liquid monomer phase for the polymerization according to the present invention. It is, however, not excluded that the gas-phase contains molecules that do not take part in the polymerization process, such as solvent molecules. It is also not excluded that the gas-phase contains molecules other than the polymerizable monomers, such as a carrier gas or a mixture of two or more carrier gases or initiator molecules.

Carrier gases are substances which are in a gaseous state at the operating temperature of the present invention. Preferably compounds are used as carrier gases which are in a gaseous state at the reaction temperature and pressure, preferably at a temperature of 80° C. or less, more preferably at a temperature of 50 or 30° C. or less. Suitable carrier gases are essentially inert towards the monomers, the initiators and the substrate under the reaction conditions and thus do not take part in the polymerization itself. Gases like He, Ne, Ar, $N_2$, $CO_2$, $H_2O$ and the like may be used.

The polymerization itself takes place in a reactor which can generally have any shape or size as long as it is able to host the initiator covered substrate. Suitable reactors can be tightly sealed against the surrounding atmosphere.

There are several possibilities to perform the process according to the present invention. Generally speaking, two different types of processes have been proven to be successful.

According to a first type of process according to the present invention, in a first step a) the initiator is activated by contacting with the zero-valent metal. This can generally be done by all methods known to the skilled person like vaporizing under reduced pressure, vaporizing by heating, bubbling with carrier gas flow or sublimating by heating under reduced pressure.

It is also possible as a first step a), to contact the zero valent metal with the initiator in the liquid state before introducing the metal/initiator combination into the reactor.

In the second step b) of this first process type according to the present invention, the monomer is introduced into the reactor in the gaseous state. This can generally be achieved by all methods known to the skilled person like vaporizing under reduced pressure, vaporizing by heating, bubbling with carrier gas flow or sublimating by heating under reduced pressure.

In a second type of reaction, the monomer and the initiator are introduced either simultaneously into the reactor or the monomer or monomer mixture is first introduced into the reactor (either completely or at least partially) and the initiator is added after the (partial) introduction of the monomer. Thus, step a) and b) are performed simultaneously. Hereinafter, when copolymerization of different types of monomers is described, reference to step b) is made for both types of processes.

Generally, the monomers can thus be introduced into the reactor before during or after the activation of the initiator. In a preferred embodiment of the present invention, the monomers are introduced after or during the activation of the initiator.

During the second step b) of the first type of polymerization according to the present invention, monomer is consumed from the gas-phase and polymer is formed on the surface of the substrate. The reaction time for this step b) of the process according to the present invention depends upon the desired molecular weight of the polymer and the speed of the reaction. The reaction speed can be varied in conventional ways known to the skilled person, e.g., by variation of the monomer type, monomer concentration, reaction temperature, flow rate of the carrier gas, the surface area of the substrate coated by the initiator or accelerators such as light.

In order to produce a copolymer according to the present invention, the polymerization of the first monomer or the first monomer mixture is stopped in step b), when the desired molecular weight is obtained.

Thus, in a further embodiment according to the present invention two or more different types of radically polymerizable monomers are consecutively introduced into the reactor.

A process according to the present invention which results in the formation of copolymers can comprise consecutive steps A and B, wherein
- in a first step A a radically polymerizable monomer or a mixture of two or more radically polymerizable monomers is introduced into a reactor under the above mentioned conditions and is polymerized and
- in one or more following consecutive steps B a different type of radically polymerizable monomer or mixture of two or more radically polymerizable monomers is introduced into the reactor and polymerized, where the monomer or monomer mixture differs from the type of radically polymerizable monomer or mixture of two or more radically polymerizable monomers in the antecedent step and
- wherein the concentration of the radically polymerizable monomer or monomers is lowered to a point where the polymerization essentially stops before the next different monomer type is introduced into the reactor in the next consecutive step.

The interruption of the polymerization between two consecutive steps can be achieved by lowering the reaction temperature, the flow rate of carrier gas or the concentration of the at least one ethylenical unsaturated monomer in the gas-phase such that the polymerization reaction pauses.

The interruption of the reaction can be achieved, e.g., by monomer consumption or by actively reducing the monomer concentration, e.g., by applying a vacuum to the reactor. It is within the scope of the present invention that after step b) a certain amount of monomer from step a) is still present in the gas-phase which, however, does not polymerize due to its low concentration, or the rate of polymerization is very low.

It is thus not necessary that the monomer of the antecedent polymerization step is completely removed from the reactor. It is also within the scope of the present invention, that some of the monomer or monomer mixture used in the antecedent step is still within the reactor when the monomer or monomer mixture for the next polymerization step is introduced into the reactor. In order to obtain well separated blocks in the copolymer it has, however, been found to be advantageous if the ratio of the concentration of monomers or of a monomer composition employed in the antecedent step and the concentration of monomers or of a monomer composition of a different type employed in the next consecutive polymerization step initially in the reactor at the beginning of this next consecutive polymerization step is less than 0.01. The term "initially in the reactor" is to be defined as above in the present text.

In a copolymerization reaction according to the present invention, at least one ethylenical unsaturated monomer is introduced into the reactor in a step B, which is different from the at least one ethylenical unsaturated monomer in the gas-phase of antecedent step A or an antecedent step B.

The introduction of a third monomer or monomer mixture or further monomers or monomer mixtures is governed by the same rules as the introduction of the second monomer or monomer mixture of step B.

It is also within the scope of the present invention to repeat step B one or more times in order to build a copolymer with two or more blocks, where the above requirements for step B also apply.

The reaction steps can generally be performed at a temperature of from about −80 to about 200° C., depending on the type of initiator, the type of activation and the monomer types. In a preferred embodiment of the present invention, the reaction temperature in the steps of the inventive process is from about 0° C. to about 150° C. or from about 20 to about 100° C. or from about 40 to about 70° C., especially from about 45 to about 65° C.

The reaction time can essentially last for any time specified by the operator, as long as the chain ends of the polymers are still "alive" and the polymerization can still propagate. Generally, the reaction time per step, i.e., for a chosen type of monomer or for a chosen monomer composition, the reaction time can vary in broad ranges, e.g., between about 10 minutes to about 5 days, depending on the type of monomers, the desired molecular weight, the initiator and the substrate. In a preferred embodiment of the present invention, the reaction time for one polymerization step is in the order of from about 1 to about 50 h, preferably from about 2 to about 40 h.

The process according to the invention can be used to produce homo polymers or copolymers in a solvent-free, effective way on an almost unlimited variety of metals or metal coated substrates. The possibility to apply the metal on the substrates in different patterns furthermore opens a way to produce polymers in predetermined 2D or 3D patterns. The present invention thus also relates to a process wherein the zero-valent metal is provided on the substrate in a 2D or 3D pattern. By extending the process according to the present invention to substrates covered by a patterned metal coating it has been possible to produce two dimensional and three-dimensional polymer structures in a very efficient and effective way. Generally, all types of patterns and structures can be obtained by using the process according to the present invention. Suitable 2D or 3D structures are, e.g., circular or elliptical areas, angular areas like triangular, polyangular, rectangular and square areas, regularly or irregularly repeating 2D patterns like stripes, dots and the like, all types of irregular 2D patterns like figures or characters, all types of 3D patterns like cubes, cones, spheres, rods, cylinders, pyramids or regularly or irregularly shaped objects like microstructures and the like.

Thus, the present invention also relates to polymer/metal composites obtainable by the process according to the present invention.

If the process according to the present invention is used to produce block copolymers, such block copolymers can generally have any desired type of block structure. They can, for instance, have a simple AB-structure, where A and B denote different types of monomers. Block copolymers according to the present invention can, however, also have a more complicated structure, depending on the numbers of consecutive polymerization steps and the monomer feed in each polymerization step. It is within the scope of the present invention that the monomer feed in each polymerization step of the inventive process can not only consist of one single type of monomer but can also consist of two or more different types of monomers. Thus, a block copolymer according to the present invention can have two or more consecutive blocks of different monomer composition, wherein the monomer composition within each block can consist of only one type of monomer or can be a composition of two or more different types of monomers. For example, in a first polymerization step a block structure AAAAAAAAAAAAAAA consisting of only one type of monomer A is produced. In a second polymerization step, a monomer feed consisting of monomers A and B is introduced so that the second block has a random block structure BAABABBBABABB consisting of monomers A and B. In a third step, for instance, monomers C and D can be introduced in the polymerization process, which will result in a third random block CDCCDCDDCDCD in the block copolymer according to the present invention.

It is obvious from the above that such block copolymers can generally be tailor made with regard to their composition by varying the monomer feed in the consecutive polymerization steps as described above.

The polymers according to the present invention generally have a number average molecular weight $M_n$ between about 400 and about 2,000,000, depending on the type of monomer, initiator, the initiator concentration per area, the substrate or the reaction conditions like temperature and monomer concentration.

The polymers according to the present invention generally have a polydispersity index (PDI) in the range of from about 1.3 to about 30, also depending on the above mentioned reaction parameters.

It lies also within the scope of the present invention that the polymer layer is modified after the polymerization has been completed, e.g., by a polymer analogous reaction or the like. Suitable polymer analogous reactions can be, e.g., grafting or ester cleavage or the like.

The invention is explained in further detail by the following examples.

EXAMPLES

Example 1

Preparation of poly(methyl methacrylate) by a System: Fe(0) Powder/methyl α-bromophenylacetate on a Glass Plate Surface The monomer, methyl methacrylate (MMA, 99.0%) was purchased from Tokyo Kasei and purified by distillation just before polymerization. The initiator (methyl α-bromophenylacetate MBP), was purchased from Aldrich and used as received. Zero-valent iron powder (Fe(0)), was purchased from Wako, and used as received. The reaction was carried out in a H-shaped glass tube reactor with a vacuum cock and a glass filter separator (pore size 20-30 μm) at the bridge part. MBP (11.13 mg, 48.59 μmol) and Fe(0) powder (35.18 mg) were spread on a glass plate surface (154 mm$^2$). The glass plate was dried at ambient temperature for 1 h and set in one bottom of the H-shaped glass tube. A solution of MMA (0.5 ml, 4.67 mmol) and 4-t-butylcatechol (ca. 20 mg) was added in the other bottom of the H-shaped glass tube. Three cycles of rapid vacuum to argon were applied in order to remove oxygen, and the reactor was then degassed for 20 min in a dry ice/methanol bath in vacuo. Polymerization was carried out under a saturated vapor pressure of MMA ($2.35 \times 10^4$ Pa) in a thermostated oven at 60° C. After 24 h, the polymerization was stopped. The glass plate was weighed and determined to have increased 185.48 mg in weight. The product was dissolved in CHCl$_3$, precipitated into methanol, and isolated by filtration. The product was dried under reduced pressure for 24 h at 25° C. and analyzed by Fourier transfer infrared (FTIR), $^1$H-NMR spectroscopy and gel permeation chromatography (GPC). The FTIR spectrum of the product was recorded on a JASCO FT-IR 460 plus spectrometer and showed a sharp $v_{c=o}$ peak at 1731 cm$^{-1}$. $^1$H-NMR spectrum was measured on a 400-MHz Varian INOVA 400 spectrometer and showed a sharp singlet peak at 3.60 ppm assigned to —COOCH$_3$ of the MMA unit. The molecular weight of the product was measured on a TOSOH HLC-8220 GPC system with refractive index (RI) and ultra violet (UV, 254 nm) detectors. The average molecular weight of the product as obtained from the GPC profile monitored with RI detector was $Mn_{RI}$=7,400 and $Mw_{RI}$=68,350.

Example 2

Preparation of poly(methyl methacrylate) by a System: Fe(0) Powder/methyl α-bromophenylacetate on an Aluminum Pan Surface The reaction was carried out in an H-shaped glass tube reactor. MBP (1.09 mg, 4.76 μmol) and Fe(0) powder (2.45 mg) were spread with CH$_2$Cl$_2$ on a 5 mmØ aluminum pan (Al-pan) surface. The Al-pan was dried at ambient temperature for 1 h and set in one bottom of the H-shaped glass tube. A solution of MMA (0.5 ml, 4.67 mmol) and 4-t-butylcatechol (ca. 20 mg) was added in the other bottom of the H-shaped glass tube. Three cycles of rapid vacuum to argon were applied in order to remove oxygen, and the reactor was then degassed for 20 min in a dry ice/methanol bath in vacuo. Polymerization was carried out under a saturated vapor pressure of MMA ($2.35 \times 10^4$ Pa) in a thermostated oven at 60° C. After 12 h, the polymerization was stopped. The Al-pan was weighed and determined to have increased by 39.08 mg in weight. The product was dissolved in CHCl$_3$, precipitated into methanol, and isolated by filtration. The product was dried under reduced pressure for 24 h at 25° C. and analyzed by FTIR, $^1$H-NMR spectroscopy and GPC. The FTIR spectrum of the product showed a sharp $v_{c=o}$ peak at 1731 cm$^{-1}$. The $^1$H-NMR spectrum showed a sharp singlet peak at 3.60 ppm assigned to —COOCH$_3$ of the MMA unit. Average molecular weights of the product as obtained from the GPC profile monitored with RI detector were $Mn_{RI}$=12,000 and $Mw_{RI}$=286,000.

Comparative Example 1

Preparation of poly(methyl methacrylate) by a System: Fe(0) Powder/methyl α-bromophenylacetate/2,2'-bipyridine on an Aluminum Pan Surface Ligand, 2,2'-bipyridine (Bpy) was purchased from Across Organics and used as received. The reaction was carried out in an H-shaped glass tube reactor. MBP (1.03 mg, 4.50 µmol), Fe(0) powder (1.67 mg) and Bpy (0.77 mg, 4.93 µmol) were spread with $CH_2Cl_2$ on 5 mmØ aluminum pan (Al-pan) surface. The Al-pan was dried at ambient temperature for 1 h and set in one bottom of the H-shaped glass tube. A solution of MMA (0.5 ml, 4.67 mmol) and 4-t-butylcatechol (ca. 20 mg) was added in the other bottom of the H-shaped glass tube. Three cycles of rapid vaccum to argon were applied in order to remove oxygen, and the reactor was then degassed for 20 min in a dry ice/methanol bath in vacuo. Polymerization was carried out under a saturated vapor pressure of MMA ($2.35 \times 10^4$ Pa) in a thermostated oven at 60° C. After 12 h, the polymerization was stopped. The Al-pan was weighed and determined to have increased by 0.41 mg in weight. The product was dissolved in $CHCl_3$, precipitated into methanol, and isolated by filtration. The product was dried under reduced pressure for 24 h at 25° C. and analyzed by FTIR, $^1$H-NMR spectroscopy and GPC. The FTIR spectrum of the product showed a sharp $v_{c=o}$ peak at 1731 $cm^{-1}$. The $^1$H-NMR spectrum showed a sharp singlet peak at 3.60 ppm assigned to —COOC$\underline{H}_3$ of the MMA unit. The average molecular weights of the product as obtained from the GPC profile monitored with the RI detector were $Mn_{RI}$=710 and $Mw_{RI}$=11,700.

Obviously, the results according to Example 2 are higher in yield and molecular weights compared with the results in comparative example 1, in which a ligand was used as a component of the catalytic system.

Example 3

Preparation of poly(styrene) by a System: Fe(0) Powder/ methyl α-bromophenylacetate on a Glass Plate Surface The monomer styrene (St, 99.5%) was purchased from Kishida Chemical Inc. and purified by distillation just before polymerization. The reaction was carried out in an H-shaped glass tube reactor. MBP (16.97 mg, 74.08 µmol) and Fe(0) powder (33.98 mg) were spread on a glass plate surface (154 $mm^2$). The glass plate was dried at ambient temperature for 1 h and set in one bottom of the H-shaped glass tube. A solution of St (0.5 ml, 4.36 mmol) and 4-t-butylcatechol (ca. 20 mg) was added in the other bottom. Three cycles of rapid vacuum to argon were applied in order to remove oxygen, and the reactor was then degassed for 20 min in a liquid nitrogen bath in vacuo. Polymerization was carried out under a saturated vapor pressure of St ($1.43 \times 10^4$ Pa) in a thermostated oven at 80° C.

After 10 h, the polymerization was stopped. The glass plate was weighed and determined to have increased by 75.03 mg in weight. The product was dissolved in $CHCl_3$, precipitated into methanol, and isolated by filtration. The polymer was dried under reduced pressure for 24 h at 25° C. and analyzed by $^1$H-NMR and GPC. The $^1$H-NMR spectrum showed broad peaks at 6.2-7.2 ppm assigned to the aromatic ring protons of the St unit. The average molecular weights of the product obtained from the GPC profile as monitored with the RI detector were $Mn_{RI}$=640 and $Mw_{RI}$=1,400.

Example 4

Preparation of poly(methyl methacrylate-block-styrene) by a System: Fe(0) Powder/methyl α-bromophenylacetate on a Glass Plate Surface The reaction was carried out in the H-shaped glass tube. MBP (17.53 mg, 76.52 µmol) and Fe(0) powder (35.38 mg) were spread on a glass plate (154 $mm^2$). The glass plate was dried at ambient temperature for 1 h and set in one bottom of the H-shaped glass tube. A solution of MMA (0.5 ml, 4.67 mmol) and 4-t-butylcatechol (ca. 20 mg) was added in the other bottom. Three cycles of rapid vacuum to argon were applied in order to remove oxygen, and the reactor was then degassed for 20 min in a dry ice/methanol bath in vacuo. The first stage of the reactions, the reaction of MMA, was carried out under a saturated vapor pressure of MMA ($2.35 \times 10^4$ Pa) in a thermostated oven at 60° C. After 24 h, the polymerization was stopped by removing the remaining MMA at room temperature for 1 h in vacuo. Afterwards, 0.5 ml (4.36 mmol) of the second monomer, St, was introduced into the other bottom with a syringe through the glass cock under argon gas flow. The reactor was subjected again to the three times of freeze-pump-thaw cycle, and then sealed in vacuo. The second stage of the reaction was also carried out under saturated vapor pressure ($1.43 \times 10^4$ Pa) for 24 h at 80° C. in a similar way to the first stage reaction without addition of any other initiators. After the second stage of the reaction, the reaction was stopped. The glass plate was weighed and determined to have increased by 221.27 mg in weight. The product was dissolved in $CHCl_3$, precipitated into methanol, and isolated by filtration. The polymer was dried under reduced pressure for 24 h at 25° C. and analyzed by GPC. The average molecular weights of the polymer calculated from the GPC profiles monitored with UV detectors were $Mn_{uv}$=1,300 and $Mw_{uv}$=1,600.

The differences in molecular weight and polydispersity in this example as compared to examples 1 and 2 can be explained as follows: Firstly, in this example, a large amount of initiator (17.53 mg) was used, which results in a decrease in molecular weight, compared to example 1 (11.13 mg) and example 2 (1.09 mg). Secondly, the product was purified by precipitation with methanol, which caused removal of lower molecular weight components, resulting in the narrow polydispersity. Thirdly, the gas-phase polymerization on surfaces is influenced by the chemical and physical conditions of substrate surface. The aluminum pan (examples 1 and 2) has a large surface area compared to the glass plate (example 3). Thus, the per-area initiator concentration on the glass plate surface is much higher than the per-area initiator concentration on the aluminum pan in experiments 1 and 2, which results in a decrease in molecular weight.

Example 5

Preparation of poly(methyl methacrylate) by a System: Fe(0) Powder/p-toluenesulfonyl chloride on a Glass Plate Surface The initiator, p-toluenesulfonyl chloride (TsCl) was purchased from Wako, and used as received. Reaction was carried out in an H-shaped glass tube reactor. TsCl (50 mg, 0.26 mmol) and Fe(0) powder (100 mg) were spread with diethyl ether on a glass plate surface (154 $mm^2$). The glass plate was dried at ambient temperature for 1 h and set in one bottom of an H-shaped glass tube. A solution of MMA (0.5 ml, 4.67 mmol) and 4-t-butylcatechol (ca. 20 mg) was added in the other bottom. Three cycles of rapid vacuum to argon were applied in order to remove oxygen, and the reactor was then degassed for 20 min in a dry ice/methanol bath in vacuo. The polymerization was carried out under a saturated vapor pressure of MMA ($2.35 \times 10^4$ Pa) in a thermostated oven at 60° C. After 10 h, the polymerization was stopped. The glass plate was weighed and determined to have increased by 160 mg in weight. Product was dissolved in CHCl$_3$, precipitated into methanol, and isolated by filtration. The polymer was dried under reduced pressure for 10 h at 25° C. and analyzed by FTIR, $^1$H-NMR and GPC. The FTIR spectrum of the product showed a sharp $v_{c=o}$ peak at 1731 cm$^{-1}$. The $^1$H-NMR spectrum showed a sharp singlet peak at 3.60 ppm assigned to —COOC$\underline{H}_3$ of the MMA unit. The average molecular weights of the product obtained from the GPC profile as monitored with RI detector were Mn$_{RI}$=4,400 and Mw$_{RI}$=11,300.

Example 6

Preparation of poly(methyl methacrylate) by a System: Fe(0) Powder/methyl 2-chloropropionate on a Glass Plate Surface The initiator, methyl 2-chloropropionate (MC) was purchased from Aldrich, and used as received. The reaction was carried out in an H-shaped glass tube reactor. A glass plate (15×15 mm) was placed on the bottom of the H-shaped glass tube. Fe(0) powder (22.69 mg) was placed on the glass plate in the glass tube, and MC (0.2 ml, 220 mg, 1.75 mmol) was added under the glass plate in the bottom of the glass tube reactor. A solution of MMA (2.0 ml, 18.70 mmol) and 4-t-butylcatechol (ca. 20 mg) was added on the other bottom. Three cycles of rapid vacuum to argon were applied in order to remove oxygen, and the reactor was then degassed for 20 min in a dry ice/methanol bath in vacuo. The polymerization was carried out under a saturated vapor pressure of MMA (2.35×10$^4$ Pa) in a thermostated oven at 60° C. After 5 days, the polymerization was stopped. The glass plate was weighed and determined to have increased by 10.77 mg in weight. The product was dissolved in tetrahydrofuran (THF), precipitated into methanol, and isolated by filtration. The polymer was dried under reduced pressure for 10 h at 25° C. and analyzed by FTIR, $^1$H-NMR and GPC. The FTIR spectrum of the product showed a sharp $v_{c=o}$ peak at 1731 cm$^{-1}$. $^1$H-NMR spectrum showed a sharp singlet peak at 3.60 ppm assigned to —COOC$\underline{H}_3$ of the MMA unit. The average molecular weights of the product obtained from the GPC profile as monitored with RI detector were Mn$_{RI}$=450 and Mw$_{RI}$=1,400.

Example 7

Preparation of poly(methyl methacrylate) by methyl 2-chloropropionate on an Iron Plate Surface An iron plate (Fe(0) plate, 25×50 mm) was purchased from Aldrich, and used as received. Reaction was carried out in the H-shaped glass tube reactor. The Fe(0) plate was placed into a glass tube of the H-shaped glass tube reactor, and MC (0.2 ml, 220 mg, 1.75 mmol) was added under the Fe(0) plate on the bottom of the glass tube reactor. MMA (0.5 ml, 4.67 mmol) and 4-t-butylcatechol (ca. 20 mg) were added on the other bottom. Three cycles of rapid vacuum to nitrogen were applied in order to remove oxygen, and the reactor was then degassed for 20 min in a dry ice/methanol bath in vacuo. The polymerization was carried out under a saturated vapor pressure of MMA (2.35×10$^4$ Pa) in an oven at 60° C. After 5 days, the polymerization was stopped. The product formed on the Fe(0) plate was analyzed intact by FTIR spectroscopy. The FTIR spectrum of the product showed a sharp $v_{c=o}$ peak at 1731 cm$^{-1}$, indicating the production of PMMA. The average molecular weights of the product obtained from the GPC profile as monitored with RI detector were Mn$_{RI}$=13,900 and Mw$_{RI}$=19,400.

Example 8

Preparation of poly(1H,1H-pentafluoropropyl methacrylate) by a System: Fe(0) Powder/methyl α-bromophenylacetate on poly(ethylene terephthalate) (PET) Sheet Surface The monomer, 1H,1H-pentafluoropropyl methacrylate (FMA, 99.0%) was purchased from Shin-Etsu Chemical Co., Ltd. and purified by distillation just before polymerization. The reaction was carried out in an H-shaped glass tube reactor. The PET sheet (25×50 mm) was coated with Fe(0) powder by static electricity. The PET sheet was placed onto a glass plate on one bottom of the H-shaped glass tube reactor. MBP (0.2 ml, 290 mg, 1.27 mmol) was added under the glass plate in the bottom of the glass tube reactor. FMA (2.0 ml, 12.37 mmol) and 4-t-butylcatechol (ca. 20 mg) were added in another bottom. Three cycles of rapid vacuum to nitrogen were applied in order to remove oxygen, and then the reactor was degassed for 20 min in a liquid nitrogen bath in vacuo. The polymerization was carried out under a saturated vapor pressure of FMA (4.62×10$^4$ Pa) in an oven at 60° C. After 5 days, the polymerization was stopped. The product formed on the PET sheet was analyzed intact by FTIR, and scanning electron microscopy (SEM). The FTIR spectrum of the product showed a sharp absorption peak at 1719 cm$^{-1}$, which peak was assigned to $v_{c=o}$ of ester carbonyl in the FMA unit. Cross-sectional observation of the product on the PET sheet was performed with SEM with a HITACHI S3000N SEM at an accelerating voltage of 15 kV with a backscattered electron (BSE) detector. The cross-sectional SEM images formed by BSE indicated that the surface of PET sheet was covered by a PFMA layer including Fe(0) powder.

Example 9

Preparation of poly(methyl methacrylate) by a System: Fe(0) Powder/methyl α-bromophenylacetate on poly(ethylene terephthalate) (PET) Sheet Surface The reaction was carried out in an H-shaped glass tube reactor. The PET sheet (25×50 mm) was coated with Fe(0) powder by static electricity. The PET sheet was placed onto a glass plate on one bottom of the H-shaped glass tube reactor. MBP (0.2 ml, 290 mg, 1.27 mmol) was added under the glass plate on the bottom of the glass tube reactor. MMA (0.5 ml, 4.67 mmol) and 4-t-butylcatechol (ca. 20 mg) were added onto the other bottom. Three cycles of rapid vacuum to nitrogen were applied in order to remove oxygen, and then the reactor was degassed for 20 min in a dry ice/methanol bath in vacuo. The polymerization was carried out under a saturated vapor pressure of MMA (2.35×10$^4$ Pa) in an oven at 60° C. After 5 days, the polymerization was stopped. Cross-sectional observation of the product on the PET sheet was performed with a HITACHI S3000N SEM at an accelerating voltage of 15 kV with a backscattered electron (BSE) detector. The cross-sectional SEM images formed by BSE indicated that the surface of PET sheet was covered by PFMA layer including Fe(0) powder.

Comparative Example 2

Coating Test of poly(ethylene terephthalate) Sheet by Gas-phase Polymerization of methyl methacrylate with methyl α-bromophenylacetate as Initiator The reaction was carried out in the same way as Example 9 without the coating by Fe(0) powder. After 5 days, the reaction was stopped. Cross-sectional observation of the product on the PET sheet was performed with SEM. However, no coating of the PET sheet was observed.

Compared with the result of Example 9, it is obvious that the Fe(0) is essential to the gas-phase polymerization of MMA on the PET sheet with MBP as the initiator.

Example 10

Adhesion of poly(tetrafluoroethylene) Sheets by Gas-phase Polymerization of methyl methacrylate with a System Fe(0) Powder/methyl α-bromophenylacetate Two poly(tetrafluoroethylene) (PTFE) sheets (25×50 mm) were attached by static electricity and inserting Fe(0) powder (ca. 50 mg). The reaction was carried out in an H-shaped glass tube reactor. A glass plate was placed on one bottom of the H-shaped glass tube, and the attached PTFE sheets were placed on the glass plate. MBP (0.2 ml, 290 mg, 1.27 mmol) was added under the glass plate on the bottom of the glass tube reactor. MMA (0.5 ml, 4.67 mmol) and 4-t-butylcatechol (ca. 20 mg) were added onto the other bottom. Three cycles of rapid vacuum to nitrogen were applied in order to remove oxygen, and then the reactor was degassed for 20 min in a dry ice/methanol bath in vacuo. Polymerization was carried out under a saturated vapor pressure of MMA ($2.35 \times 10^4$ Pa) in an oven at 60° C. After 7 days, the polymerization was stopped. The two PTFE sheets adhered without any support.

Example 11

Preparation of poly(1H,1H-pentafluoropropylmethacrylate) by a System: Fe(0) Powder/methyl α-bromophenylacetate on Tissue Paper Surface The reaction was carried out in an H-shaped glass tube reactor. Fe(0) powder was attached to tissue paper (10×10 mm). The tissue paper was placed onto a glass plate on one bottom of the H-shaped glass tube reactor. MBP (0.1 ml, 146 mg, 0.64 mmol) was added under the glass plate into the bottom of the glass tube reactor. Monomer, FMA (0.5 ml, 2.93 mmol) and 4-t-butylcatechol (ca. 20 mg) were added onto the other bottom. Three cycles of rapid vacuum to nitrogen were applied in order to remove oxygen, and then the reactor was degassed for 20 min in a dry ice/methanol bath in vacuo. Polymerization was carried out under a saturated vapor pressure of FMA ($4.62 \times 10^4$ Pa) in an oven at 60° C. After 3 days, the polymerization was stopped. Product formed on the tissue paper surface was observed by SEM with BSE detector. SEM images formed from BSE indicated that the tissue paper texture was combined with PFMA layer including Fe(0) powder, explaining the remarkable water-repellency of the tissue after the polymerization.

Example 12

Preparation of poly(methyl methacrylate) by a System: Cu(0) Powder/methyl α-bromophenylacetate on an Aluminum Pan Surface Copper powder, Cu(0), from Kanto Chemicals was used as received. Reaction was carried out in an H-shaped glass tube reactor. A solution of MBP (297.0 mg, 1.3 mmol in $CH_2Cl_2$ 5 ml) was prepared. A 0.05 ml aliquot of the solution ($5.82 \times 10^{-6}$ mol) was spread on the bottom surface of a 5 mmØ aluminum pan (Al-pan), followed by the addition of Cu(0) powder (1.88 mg). The Al-pan was dried at ambient temperature for 1 h and set onto one bottom of the H-shaped glass tube reactor. MMA (0.5 ml, 4.67 mmol) including 4-t-butylcatechol (20 mg) was added onto the other bottom of the reactor. The reactor was subjected to three times of freeze-pump-thaw cycle, and then sealed by a cock in vacuo. The reaction was carried out under saturated vapor pressure ($2.35 \times 10^4$ Pa) at 60° C. in a thermostated oven for 12 h. After the reaction, the Al-pan was weighed. 6.96 mg of the product were deposited on the Cu(0) powder. The product was analyzed intact by FTIR, and then dissolved in $CHCl_3$ to be analyzed by $^1$H-NMR and GPC. $^1$H-NMR spectrum showed a sharp singlet peak at 3.65 ppm assigned to —COOC$\underline{H}_3$ of the MMA unit. Molecular weight of the product was $Mn_{RI}$ 22,900 and $Mw_{RI}$ 112,200.

Example 13

Preparation of poly(methyl methacrylate) by a System: Cu(0) Powder/methyl α-bromophenylacetate/Co-initiator on an Aluminum Pan Surface The co-initiator, benzyltrimethylammonium tribromide (BTB) from TCI Chemicals was used as received. The reaction was carried out in an H-shaped glass tube reactor. MBP (301.1 mg) and co-initiator, BTB, (510.2 mg) were mixed and dissolved in 5 ml of $CH_2Cl_2$ ($2.59 \times 10^{-1}$ mol l$^{-1}$). A 0.02 ml aliquot of the solution (MBP $5.24 \times 10^{-6}$ mol, BTB $5.24 \times 10^{-6}$ mol) was spread on the bottom surface of an Al-pan, and followed by the addition of Cu(0) powder (2.23 mg). The Al-pan was dried at ambient temperature for 1 h and set onto the bottom of the H-shaped glass tube reactor. MMA (0.5 ml, 4.67 mmol) including 4-t-butylcatechol (20 mg) was added onto the other bottom of the reactor. The reactor was subjected to three times of freeze-pump-thaw cycle, and then sealed by a cock in vacuo. The reaction was carried out under saturated vapor pressure ($2.35 \times 10^4$ Pa) at 60° C. in a thermostated oven for 12 h. After the reaction, the Al-pan was weighed. 16.10 mg of the product were deposited on the Cu(0) powder. The product was analyzed intact by FTIR, and then dissolved in $CHCl_3$ to be analyzed by $^1$H-NMR and GPC. The $^1$H-NMR spectrum showed a sharp singlet peak at 3.65 ppm assigned to —COOC$\underline{H}_3$ of the MMA unit. The molecular weight of the product was $Mn_{RI}$ 6,900 and $Mw_{RI}$ 77,700.

What is claimed is:

1. A process for polymerizing a radically polymerizable monomer or a mixture of two or more radically polymerizable monomers in a reactor to form a polymer, said process comprising contacting at least one zero valent transition metal selected from groups 3 to 12 of the periodic system of elements with an initiator having one or more radically transferable atoms or groups, wherein the radically polymerizable monomer or monomers are introduced into the reactor in the gas-phase and the reactor is at a temperature where the radically polymerizable monomer or monomers are present in the gas-phase during polymerization, wherein the molar ratio of zero valent metal to N—, O—, P— or S-containing ligands which coordinate in a σ-bond or a π-bond to the zero valent transition metal and are not built into the polymer or the amount of C-containing compounds which can coordinate in a π-bond to the zero valent transition metal and are not built into the polymer is more than 1:1, and wherein said zero valent transition metal is present on a substrate having an at least partially metallic surface.

2. The process of claim 1, wherein the molar ratio of zero valent metal to N—, O—, P— or S-containing ligands which coordinate in a σ-bond or a π-bond to the zero valent transition metal and are not built into the polymer or the amount of C-containing compounds which can coordinate in a π-bond to the zero valent transition metal and are not built into the polymer is more than $1:10^{-3}$.

3. The process of claim 1, wherein the initiator and the zero valent transition metal are contacted before introducing the radically polymerizable monomer or mixture of two or more radically polymerizable monomers into the reactor.

4. The process of claim 1, wherein the initiator and the zero valent transition metal are contacted during or after introducing the radically polymerizable monomer or mixture of two or more radically polymerizable monomers into the reactor.

5. The process of claim 1, wherein two or more different types of radically polymerizable monomers are consecutively introduced into the reactor.

6. The process of claim 5, comprising step A and at least one step B, wherein
in a first step A a radically polymerizable monomer or a mixture of two or more radically polymerizable monomers is polymerized; and
in one or more following consecutive steps B a radically polymerizable monomer or mixture of two or more radically polymerizable monomers which differs from the type of radically polymerizable monomer or mixture of two or more radically polymerizable monomers in the antecedent step is introduced into the reactor and polymerized;
wherein the concentration of the radically polymerizable monomer or mixture of radically polymerizable monomers is lowered to a point where polymerization essentially stops before the next different monomer type is introduced into the reactor in the next consecutive step.

7. The process of claim 6, wherein the ratio of the concentration of the radically polymerizable monomer or mixture of radically polymerizable monomers employed in the antecedent step to the concentration of radically polymerizable monomer or mixture of radically polymerizable monomers of a different type employed in the next consecutive polymerization step at the beginning of said next consecutive polymerization step is less than 0.01.

8. The process of claim 1, wherein the polymerization is conducted in the absence of solvents.

9. The process of claim 1, whereIn the polymerization is conducted in the absence of N—, O—, P— or S-containing ligands which coordinate in a σ-bond or a π-bond to the transition metal and are not built into the polymer and in the absence of C-containing compounds which can coordinate in a π-bond to the transition metal and are not built into the polymer.

10. The process of claim 1, wherein the molar ratio of radically polymerizable monomer or monomers to initiator or mixture of initiators is in the range of from 3:1 to 1000:1.

11. The process of claim 1, wherein the polymer formed is a block copolymer.

12. The process of claim 1, wherein the radically polymerizable monomer or mixture of radically polymerizable monomers is selected from the group consisting of styrenic monomers, vinyl acetate, acrylate and methacrylate esters of $C_1$-$C_{20}$ alcohols, acrylic acid, methacrylic acid, isobutene, acrylonitrile and methacrylonitrile.

13. The process of claim 1, wherein the zero valent transition metal is selected from the group consisting of titanium, chromium, manganese, ruthenium, iron, nickel, copper and mixtures thereof.

14. The process of claim 1, wherein the zero valent transition metal is iron or copper.

15. The process of claim 1, wherein at least one organic halide compound is used as the initiator.

16. The process of claim 1, wherein at least one $C_1$-$C_3$ alkyl ester of an alpha-halo-carboxylic acid is used as the initiator.

17. The process of claim 1, wherein said temperature is from about 20 to about 100 degrees C.

18. The process of claim 1, wherein said substrate is a metal coated substrate.

19. The process of claim 1, wherein said substrate is covered by a patterned metal coating.

20. The process of claim 1, wherein said substrate is an organic substrate having at least one metal coated thereon.

21. The process of claim 1, wherein said substrate is an inorganic substrate having at least one metal coated thereon.

* * * * *

UNITED STATES PATENT AND TRADEMARK OFFICE
CERTIFICATE OF CORRECTION

PATENT NO. : 7,247,685 B2
APPLICATION NO. : 11/318933
DATED : July 24, 2007
INVENTOR(S) : Nishida et al.

It is certified that error appears in the above-identified patent and that said Letters Patent is hereby corrected as shown below:

Title page Item (56), References Cited, "OTHER PUBLICATIONS", column 2, line 5, delete "Polymerizatin" and insert therefor --Polymerization--.

Column 22, line 1, delete "whereIn" and insert therefor --wherein--.

Signed and Sealed this

Sixteenth Day of October, 2007

JON W. DUDAS
*Director of the United States Patent and Trademark Office*